(No Model.)

D. MISELL.
ELECTRIC CIGAR LIGHTER.

No. 520,445. Patented May 29, 1894.

Witnesses:
John Becker
Wm. Schulz

Inventor:
David Misell
by his attorneys
Roeder & Brieun

THE NATIONAL LITHOGRAPHING COMPANY,
WASHINGTON, D. C.

UNITED STATES PATENT OFFICE.

DAVID MISELL, OF NEW YORK, N. Y., ASSIGNOR TO NATHANIEL S. ROSENAU, OF SAME PLACE.

ELECTRIC CIGAR-LIGHTER.

SPECIFICATION forming part of Letters Patent No. 520,445, dated May 29, 1894.

Application filed December 5, 1893. Serial No. 492,825. (No model.)

*To all whom it may concern:*

Be it known that I, DAVID MISELL, of New York city, New York, have invented an Improved Electric Cigar-Lighter, of which the following is a specification.

This invention relates to a cigar lighter which is so constructed that by depressing a spring plunger an electric current will be generated for heating an incandescent wire, by which a dip may be lighted.

Figure 1:
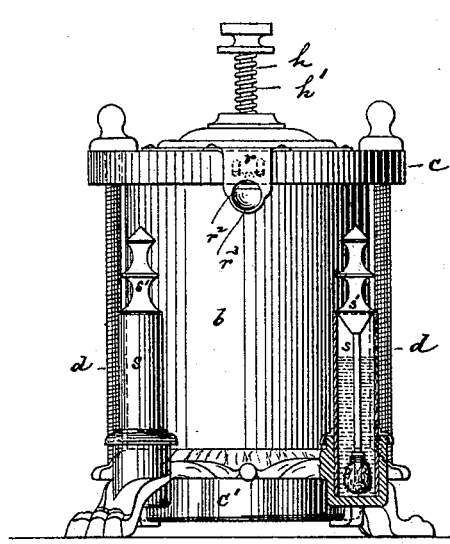
Figure 2:
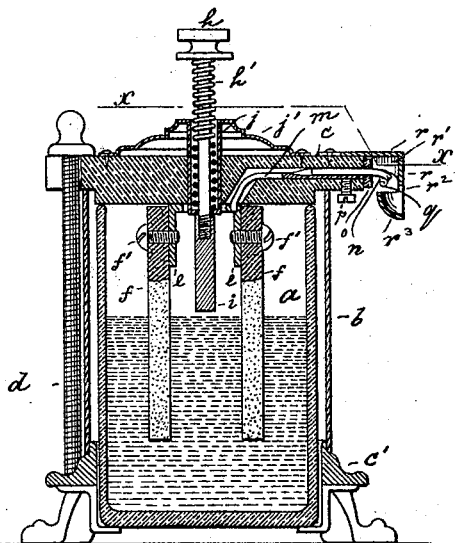
Figure 6:
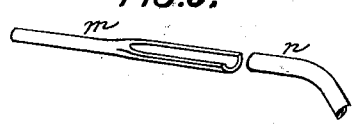
Figure 4:
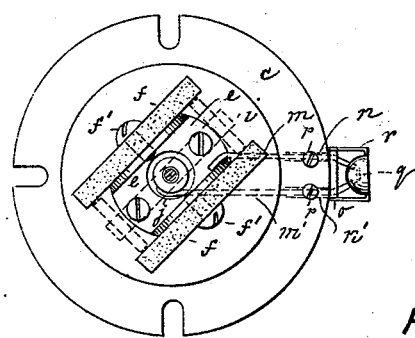
Figure 3:
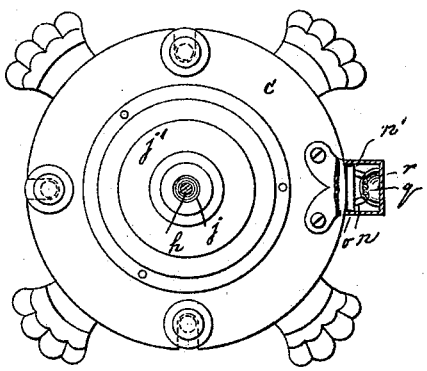
Figure 5:
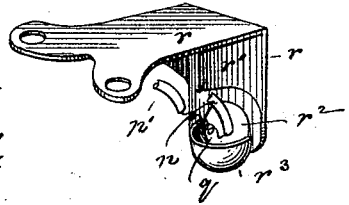

In the accompanying drawings: Figure 1 is a side elevation partly in section of my improved cigar lighter. Fig. 2 is a vertical central section thereof; Fig. 3 a cross section on line $x, x$, Fig. 2; Fig. 4 a bottom view of the cover $c$; Fig. 5 a perspective view of the guard $r$, and Fig. 6 a perspective view of the wire connection.

The letter $a$, represents a glass jar inclosed within an ornamental casing $b$, which is provided with the non-conducting cover $c$, and base $c'$. The base and cover are connected with each other, or with the casing $b$, in suitable manner, the connection shown consisting of headed springs $d$, that project upwardly from the base and engage notches in the cover. To the lower side of cover $c$, there is attached a V shaped metallic frame $e$, to which the carbons $f$, are secured by means of screws $f'$, so that they can be readily replaced. Centrally between the carbons, the cover $c$, and frame $e$, are perforated for the reception of a plunger $h$, to the lower end of which the zinc element $i$, is secured. The lower end of plunger $h$, is inclosed in a metal tube $j$, that extends downwardly from a convex face plate $j'$, secured to the upper side of cover $c$. This tube also contains the lower end of spring $h'$, coiled around the plunger and in this way the main length of the plunger is concealed and is also properly guided. When the plunger is depressed, the zinc element will be immersed in the diluted sulphuric acid contained in jar $a$, and thus the battery will be set into action, while when the plunger is released, its spring will withdraw the zinc element from the diluted acid and the battery will be set out of action.

The cover $c$, is provided with two horizontal perforations adapted for the reception of the two conducting wires $m, m'$, of which the wire $m$, connects with the frame $e$, while the wire $m'$, connects with the tube $j$, (Fig. 4.) The outer ends of the wires $m, m'$, are grooved (Fig. 6) for the removable attachment of the metal tips or wires $n, n'$, which can in this manner be readily withdrawn and replaced. The wires $n, n'$, pass through a small perforated end plate $o$, and are attached to wires $m, m'$, by binding screws $p$. At their ends, the wires $n, n'$, are connected by the small incandescent platinum coil $q$. In order to protect this coil, I surround it by a guard of peculiar construction (Fig. 5). This guard consists of a sheet metal plate bent at right angles to form an upper horizontal section, which is secured to the face of cover $c$, and a vertical section that extends some distance in front of coil $q$, (Fig. 2.) At its sides the plate $r$, is provided with the flanges $r'$, that form shoulders, which bear against the plate $o$, and prevent the guard from being bent down. The front of the guard is provided with an opening $r^2$, in the back of which there is a semicircular flange or socket $r^3$, that closes the opening at the bottom, but not at the top. To the base $c'$, there are secured the dip wells $s$, that contain the dips $s'$. These dips are introduced into the opening $r^2$, but owing to the flange $r^3$, they cannot be pushed inward sufficiently far to come into contact with the coil $q$. Thus such coil is effectively protected from injury.

In use, the plunger $h$, is depressed to set the battery into action and to heat the coil $q$. The dip $s'$, is now introduced into the opening $r^2$, so that its fumes become ignited, to ignite the dip. After a light has thus been obtained, the plunger is released to set the battery out of action and to extinguish the incandescent coil.

What I claim is—

1. The combination of a battery jar with a spring plunger, a zinc element secured thereto, a pair of battery wires, an incandescent coil and a guard $r$ that is provided with an opening $r^2$ and with a socket $r^3$, back of such opening, substantially as specified.

2. The combination of a battery jar with a spring plunger, a zinc element secured thereto, battery wires, tips removably connected thereto, a plate $o$, that receives the tips, an incandescent coil, and a guard surrounding the coil, substantially as specified.

DAVID MISELL.

Witnesses:
F. V. BRIESEN,
WM. SCHULZ.